(12) United States Patent
Orr et al.

(10) Patent No.: US 11,698,766 B2
(45) Date of Patent: Jul. 11, 2023

(54) ULTRASONIC DEVICE-TO-DEVICE COMMUNICATION FOR WEARABLE DEVICES

(71) Applicant: GOOGLE LLC, Mountain View, CA (US)

(72) Inventors: Kevin Howard Orr, Elmira (CA); Craig Eric Ranta, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/450,881

(22) Filed: Oct. 14, 2021

(65) Prior Publication Data

US 2023/0122058 A1 Apr. 20, 2023

(51) Int. Cl.
G06F 1/00 (2006.01)
G06F 3/14 (2006.01)
G06F 3/01 (2006.01)
H04W 4/029 (2018.01)

(52) U.S. Cl.
CPC ............ *G06F 3/1454* (2013.01); *G06F 3/013* (2013.01); *H04W 4/029* (2018.02)

(58) Field of Classification Search
CPC . G06F 3/00; G06F 1/163; G06F 3/005; G06F 3/012; G06F 3/014
See application file for complete search history.

(56) References Cited

U.S. PATENT DOCUMENTS

| 10,757,528 B1 | 8/2020 | Mindlin et al. |
| 2016/0139241 A1 | 5/2016 | Holz et al. |
| 2017/0358140 A1* | 12/2017 | Kohler ............... G02B 27/0172 |
| 2019/0385370 A1* | 12/2019 | Boyapalle ............... G06F 3/012 |
| 2020/0143578 A1 | 5/2020 | Schmidt |
| 2020/0304758 A1 | 9/2020 | Valli |
| 2020/0326776 A1 | 10/2020 | Taylor et al. |
| 2020/0359158 A1 | 11/2020 | Brimijoin et al. |
| 2021/0073362 A1 | 3/2021 | Alameh et al. |

OTHER PUBLICATIONS

International Search Report and Written Opinion for PCT Application No. PCT/US2022/078117, dated Mar. 21, 2023, 21 pages.

* cited by examiner

*Primary Examiner* — Michael A Faragalla
(74) *Attorney, Agent, or Firm* — Brake Hughes Bellermann LLP

(57) ABSTRACT

Systems and methods are described that can include transmitting, from a first wearable computing device, a first ultrasound signal and receiving, by the first wearable computing device and responsive to the first ultrasound signal, a second ultrasound signal from a second wearable computing device. The method can include identifying, by the first wearable computing device, a location of the second wearable computing device with respect to a location of the first wearable computing device where the location of the second wearable computing device can be identified based on a determined time-of-flight of the first ultrasound signal. The method can include establishing a wireless connection between the first wearable computing device and the second wearable computing device where the wireless connection can be based at least in part on the identifier and the identified location associated with the second wearable computing device.

20 Claims, 6 Drawing Sheets

ULTRASONIC DEVICE-TO-DEVICE COMMUNICATION FOR WEARABLE DEVICES

TECHNICAL FIELD

This description generally relates to information sharing between devices.

BACKGROUND

Point to point communications can occur between two devices without the use of network infrastructure functioning as an access point, cloud, or base station. Such communications may be facilitated by knowledge of the location of each device. For example, the location may be determined using a global positioning system (GPS). However, if the devices are indoors, GPS systems may not accurately determine the locations of the devices because GPS signals cannot permeate particular building structures, and the like. Other location tracking systems use additional external hardware and installations to determine device locations. It would be desirable to locate a device indoors with accuracy and without additional external device hardware may provide a cost effective and efficient way of communicating amongst devices.

SUMMARY

A wearable computing device can be configured as an augmented reality AR device that may communicate with other computing devices based on inaudible (e.g., ultrasonic) audio signals. The systems and methods described herein may use the ultrasound signals as a mechanism to determine a direction and/or location from which an echo ultrasound signal, responsive to a host-generated ultrasound signal, is received.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method can include transmitting, from a first wearable computing device, a first ultrasound signal and receiving, by the first wearable computing device and responsive to the first ultrasound signal, a second ultrasound signal from a second wearable computing device. The second ultrasound signal can include an identifier associated with the second wearable computing device. The method can include identifying, by the first wearable computing device, a location of the second wearable computing device with respect to a location of the first wearable computing device where the location of the second wearable computing device can be identified based on a determined time-of-flight of the first ultrasound signal. The method can include establishing a wireless connection between the first wearable computing device and the second wearable computing device where the wireless connection can be based at least in part on the identifier and the identified location associated with the second wearable computing device. The method can include causing, by the first wearable computing device and using the wireless connection, a retrieval of information from the second wearable computing device, and causing presentation of the information on a display associated with the first wearable computing device.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
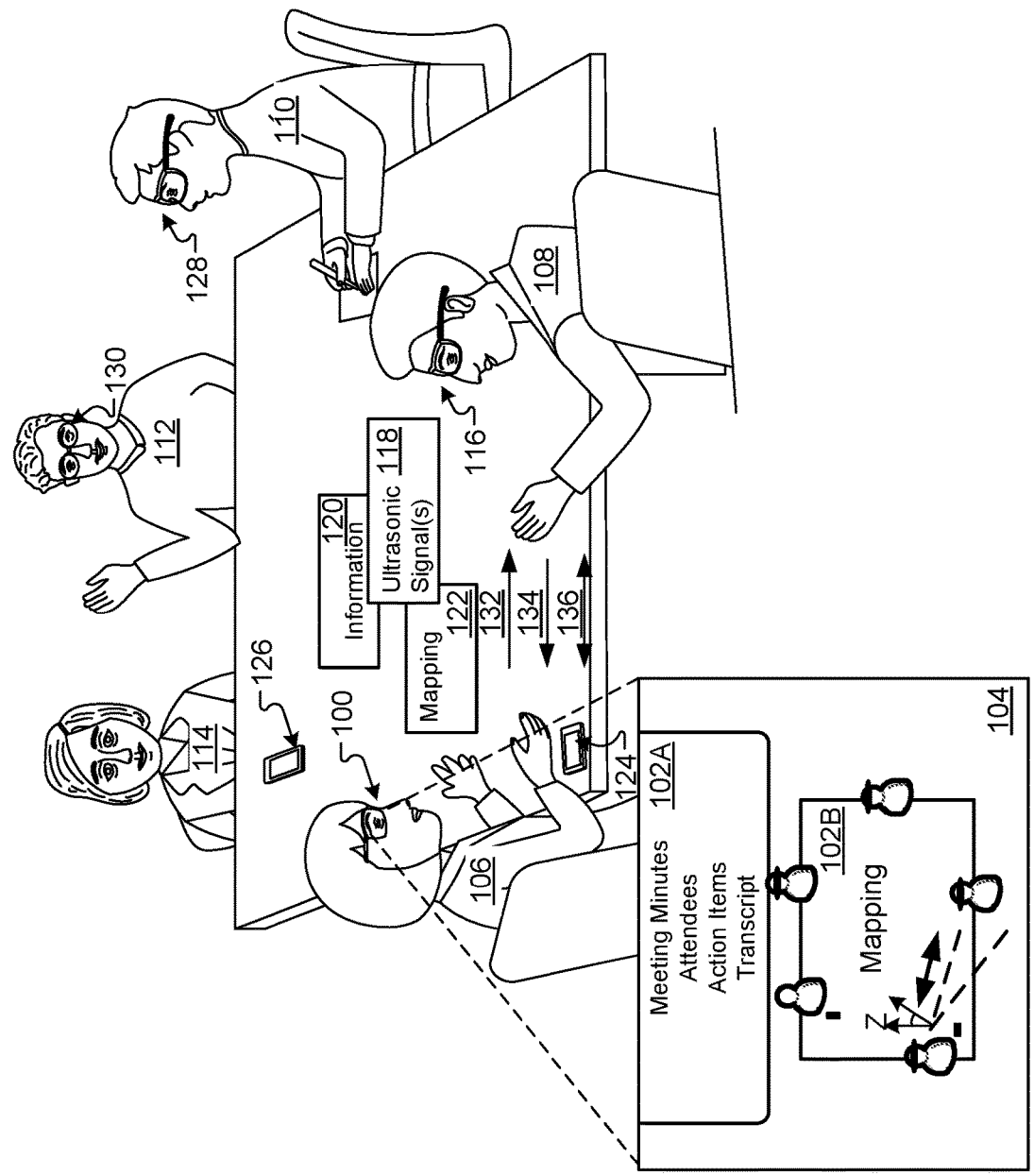
FIG. 1 is a block diagram of communication amongst users associated with wearable computing devices, according to implementations described throughout this disclosure.

This disclosure describes systems and methods for enabling device to device communications that are based on inaudible audio signals. For example, the systems and methods described herein may use ultrasonic (e.g., ultrasound) signals to facilitate communication between two or more wearable computing devices. In some implementations, the systems and methods may allow multiple users, each donning a respective wearable computing device and located within a predefined range of a physical location (e.g., a physical space) to communicate amongst respective other wearable and/or non-wearable computing devices using an ultrasound communication protocol that employs ultrasound signals (e.g., inaudible chirp signals, inaudible audio packets, inaudible audio data, etc.). In particular, the ultrasound signals may be used to transmit and/or receive communication data amongst wearable computing devices associated with the physical space.

In some implementations, the ultrasound signals may be used to communicate information between wearable computing devices during meetings, in retail settings, and in social settings, just to name a few examples. In some implementations, the ultrasound signals may be used to facilitate communications and sharing of content and/or AR content amongst device users in the physical space by generating and sharing a mapping of the objects and devices located within the physical space. In short, locational mapping, eye gaze, and sound differentiation techniques may be used alone or in combination to enable communication amongst devices in a common physical space.

The ultrasound signals may employ the ultrasound communication protocol to generate, initiate, maintain, transmit, and/or receive communications amongst wearable computing devices (or other devices) within a predefined range of a physical space. The ultrasound communication protocol may initiate and maintain communications amongst any number of devices associated with the location of the physical space. An example of a predefined range of a physical space may pertain to a frequency range, a communication range, a microphone detection range, a distance within a room or building, a predefined area or region of space in a building, a room, or geographic area, and the like.

The disclosed systems and methods may provide a technical effect of distinguishing sound direction and arrival at a receiver device (e.g., one or more microphones at a receiving wearable computing device) responsive to receiving ultrasound signals from a transmitter device (e.g., one or more speakers at a transmitting wearable computing device). The distinguished sound direction and arrival may be used as a way to establish communication and/or trigger an exchange of information for eventual display of information to the users associated with the transmitting and/or receiving devices. For example, the sound direction may be used to indicate which of a plurality of receiving devices (e.g., devices worn or held by a respective user) a transmitting wearable computing device is requesting to connect to, communicate with, share data with, and/or retrieve data from.

In some implementations, the transmitting wearable computing device is configured with the same hardware and software configurations as a receiving wearable computing device. Thus, a receiving device may also be a transmitting device. Similarly, a transmitting device may also be a receiving device. The indication of transmitting (e.g., a host) and receiving (e.g., a responder) for devices described herein functions to merely indicate which device instigated a communication. For example, a transmitting device may be indicated as a host device while a device that receives a transmission from the host device may be indicated as a receiving device or a responding device.

In some implementations, the ultrasound communication protocol described herein may perform ultrasonic tracking of users, objects, and/or other entities within a defined physical space. The protocol may use ultrasound signals (e.g., inaudible chirp signals, and the like) to ping and acknowledge computing devices, wearable computing devices, objects, and the like. The ultrasound communication protocol may include any number of audio tones (e.g., in the form of inaudible chirp signals) organized in packets, for example. The ultrasound communication protocol may utilize an ultrasonic frequency band of about 20 kilohertz to about 100 kilohertz.

In some implementations, the ultrasound communication protocol may be used as a location tracking system that can process signals received at microphones and transmitted from audio speakers. In some implementations, the ultrasound communication protocol described herein may be configured to assist in distinguishing locations, and/or directions of one or more users (e.g., of the wearable computing devices) with respect to another user associated with a wearable computing device within a physical location.

In operation, the ultrasound communication protocol may include a communication scheme based on increasing frequency modulated chirps (e.g., up-chirps) or decreasing frequency modulated chirps (e.g., down-chirps). In some implementations, the ultrasound communication protocol may include the use of up-chirps or down-chirps with a linear relationship between frequency and time. In some implementations, the ultrasound communication protocol may include the use of up-chirps or down-chirps with an exponential relationship between frequency and time. In some implementations, the ultrasound communication protocol may include the use of up-chirps or down-chirps with a monotonically changing relationship between frequency and time. In general, propagation time, multipath echo and attenuation factors may be varied to generate and send ultrasound communications between devices.

As used herein, an ultrasound signal may be referred to as an ultrasonic signal, a chirp, an up-chirp, a down-chirp, a data packet, to indicate an inaudible audio signal with a frequency that is varied with time.

FIG. 1 is a block diagram of communication amongst users associated with wearable computing devices, according to implementations described throughout this disclosure. In this example, the wearable computing devices (e.g., wearable computing device 100) are depicted in the form of Augmented Reality (AR) smart glasses. However, any form factor of a battery-powered device may be substituted and combined with the systems and methods described herein. In some implementations, the wearable computing devices may include a system on chip (SOC) architecture (not shown) in combination with any or all of one or more sensors, and one or more processors, and the like.

In operation, the wearable computing device 100 may provide a view of content (e.g., content 102A, 102B) within a virtual screen 104 (e.g., a display). The content 102A, 102B may be generated by device 100 or received from another computing device in the physical space housing users 106, 108, 110, 112, 114, or other users. For example, the content 102A, 102B may be generated by wearable computing device 116 worn by user 108 and transmitted to wearable computing device 100 of user 106 using ultrasound signals. As shown, example content 102A represents meeting minutes, attendees of the meeting, action items generated during the meeting, and transcripts. Other information is of course possible. The content 102A may be provided piecemeal during the meeting as the content is generated, discussed, and/or decided upon. In some implementations, the content 102A may be triggered for provision to all participants at the end of the meeting. Content 102B represents a mapping of the physical space in which the meeting is taking place. The content 102B may represent mapping 122, for example.

Because wearable computing device 100 may be an AR device, any content depicted on or behind virtual screen 104 may include physical content as well as AR content. In some implementations, the wearable computing device 100 may be communicably coupled with other devices, such as mobile computing devices, server computing devices, tracking devices, and/or other wearable computing devices, and the like.

The wearable computing device 100 may include one or more sensors, microphones, and/or speakers (not shown) to detect ultrasound signals 118 and/or generate information 120 based on such signals 118. Such signals may be used to define and generate a mapping 122 of objects, users, other wearable devices, and the like within a particular physical space. Similarly, user 114 may be associated with a mobile device 126, but user 114 may not have a wearable computing device. Thus, user 114 may receive signals 118, information 120, and/or mapping 122 on device 126. The users 110 and 112 are shown wearing a wearable computing device 128 and 130, respectively, but neither user 110, 112 is associated with a mobile device.

In some implementations, each wearable computing device shown in FIG. 1 may operate with an open microphone. In some implementations, the microphones of such devices may be automatically triggered to wake up with a cue word or phrase. In some implementations, the user may choose to operate the microphone of their respective wearable computing device in an open microphone mode, a wakeup mode, a user-triggered mode, or other mode.

In operation, the wearable computing device 100 may be in an in-person meeting room meeting with users 108, 110, 112, and 114. The user 108 may be associated with a mobile device 124 that may be paired or otherwise communicably coupled to wearable computing device 100. In a non-limiting example, the user 106 may trigger wearable computing device 100 to generate a first ultrasound signal (e.g., indicated by arrow 132) for transmission to the wearable computing device 116 associated with user 108. For example, the device 100 can generate one or more inaudible chirps from an onboard speaker device. The inaudible chirps may be triggered for transmission based on input from the user 106. For example, the user 106 may trigger transmission by explicit user input that includes touching software or hardware controls.

In some implementations, the user 106 may trigger transmission based on eye gaze signals, head tracked signals. In some implementations, the device 100 may automatically generate and transmit ultrasound signals at a predetermined time interval without user input. In some implementations, the device 100 may detect, via sensors and/or cameras, that one or more users, devices, and/or objects are present in a physical space and in response, may trigger an ultrasound signal 118 to begin mapping the room.

In some implementations, the device 100 may be triggered by a scheduled calendar event to begin sending a particular ultrasonic signal to other devices within the physical space of the meeting room. For example, the scheduled calendar event may be scheduled based on a time and date criteria and when the time and date criteria occurs, an application associated with the device 100, or the event may trigger the first ultrasound signal to be transmitted in order to begin mapping the participants of the meeting and the objects in the room. The generated mapping 122 may be used as a basis for communications occurring throughout the scheduled calendar event (e.g., the meeting).

In response to the received first ultrasound signals (e.g., one or more inaudible chirps), the device 116 may trigger a second ultrasound signal (e.g., indicated by arrow 132) to be sent back to the wearable computing device 100. The device 100 may receive the second ultrasound signal. The second ultrasound signal may include an identifier associated with the wearable computing device 116. The identifier may be used to identify which device in the physical space generated particular ultrasound signals, messages, content, and/or audio or visual data during the meeting, for example. In some implementations, a unique identifier may be used for each user, device, and/or object identified in the mapping 122 (e.g., mapping 102B). In some implementations, the identifier is used by wearable computing devices to differentiate from other responding devices in a particular physical space. Communications can be initiated, generated, and maintained based on the respective unique identifiers.

Although one device 116 is described as responding to the first ultrasound signal, any number of devices (e.g., device 116, 126, 128, 130, etc.) may respond to the signal and device 100 may generate a mapping 102B of any and all devices responsive to the first ultrasound signal.

The wearable computing device 100 may then identify a location of the responsive wearable computing device 116 with respect to a known location of itself (e.g., device 100). The location of the device 116 may be identified based on one or more determined time-of-flight (ToF) metrics of the first ultrasound signal (e.g., shown by arrow 132). For example, a ToF metric may be determined by device 100 to determine a location of a particular wearable computing device (or other computing device within a particular physical space of wearable computing device 100) by calculating a time of the ultrasound signal from its time of arrival at the particular wearable computing device with respect to its time of transmission from device 100. In some implementations, the ToF metrics, based on the transmitted and received ultrasound signals, may be used to generate mappings 122.

The ToF metrics may be used to determine distances between devices and/or devices and objects. Accordingly, the ToF metrics may be used to determine proximity of other devices and/or objects of interest with respect to a host device. For example, in a commercial space (e.g., retail space, public space, etc.), the ToF metrics may be used to identify how close a point of interest may be to the host device. In another example, the ToF metrics may be used to confirm that a user of the host device is within a specified boundary (e.g., within a radius, room, etc.).

In some implementations, an Angle of Arrival metric may be calculated by device 100, for example to determine particular positions of other devices and/or objects in a physical space. For example, device 100 may be configured with multiple receivers on the device to determine an exact position of the other devices and/or objects in the physical space.

The mapping 122 (such as mapping 102B) may refer to a mapped layout of a physical space (e.g., a room of objects, computing devices, wearable computing device, etc.) according to transmitted and received audio signals. The mapping may define a location for a plurality of objects associated with the physical space. For example, in FIG. 1, the users 106-114 may be in a physical room with tables and chairs. In this example, if users 106 and 108 are the only users in the physical space at a particular point in time, the mapping may also include the location of the first wearable computing device 100 and the location of the second wearable computing device 116. In addition, the mapping may include at least one location for any detected additional computing devices if additional ultrasound signals are received from respective detected additional wearable computing devices. For example, if the two users 106 and 108 are the only users in the space, the additional computing device 124 may also be part of the mapping 122. In some implementations, other wearable computing devices may also be detected and mapped according to the determined locations. If all users 106-114 are in the physical space of FIG. 1, then the systems and methods described herein may map devices 100, 106, 116, 126, 128, and 130, in a respective location based on detected ToF metrics. The mappings 122 may be updated in response to detected movements, communications, user input, additional sent data and/or signals, and the like.

In some implementations, each time a mapping 122 is generated, the generating device (e.g., device 100 in this example) may generate and provide the mapping 122 to a second device, such as wearable computing device 116. In some implementations, the device 100 may also provide mapping 122 to the additional wearable computing devices or other devices in a particular physical space if the additional ultrasound signals are received from the other devices.

In the event that other devices are in the physical space of FIG. 1, the device 100 may detect a response signal from each of the other devices associated with the physical space. For example, the device 100 may detect an ultrasound acknowledgment signal from a third wearable computing device 128, for example, and may generate an update of the mapping 122 to map the third device 128 in the same mapping 122 as device 100 and 116. The updated mapping may be sent to each device within the physical space. In this example, the updated mapping 122 that may now include device 128, may be sent by device 100 to device 116 and device 128. If the other devices 126 and 130 also send a response signal to the original ultrasound signal, that response signal may also trigger an update and redistribution of mapping 122 to all detected devices.

The updated mapping may include for each detected device (e.g., each device that provided a response to the first ultrasonic signal), a location and information 120. The information 120 may include a device identifier, and a plurality of options to communicate over the wireless connection. The device identifier may be similar to identifier of device 100, or The information 120 may also include a plurality of options to communicate over the wireless connection. In some implementations, the wireless connection may be based on user-configured device name (e.g., device identifiers) or credentials of the user, for example, to identify which particular devices are to be presented with the options. In some implementations, the options to communicate over the wireless connection are generated by device 100 and provided to another device when a communication is established between the devices. Example options to communicate over the wireless connection may include, but are not limited to, sharing user data (e.g., credentials, business cards, contact information, hobbies, resumes, etc.), sharing image and/or message data, initiating a phone call, initiating a videoconference, initiating a transaction, initiating private messages, initiating device connections and/or configurations, and the like.

In some implementations, the location of any or all devices may be identified based on similar ToF metrics or AoA metrics from a transmitted signal. In addition, a directionality from the first wearable computing device 100 to the respective wearable computing device may be used as a basis for positioning users and/or objects in the mapping 102B. In some implementations, such a mapping may be used to automatically generate audio transcripts of conversations amongst users in the meeting based on the directionality from which a particular audio signal (e.g., a speaking user or a response by a device of the user). In some implementations, the identifier of each device and particular directionality determined between devices may be used to automatically populate meeting attendees in a summary of the meeting or within transcripts, and the like.

The wearable computing device 100 may use the determined location of device 116 and/or the determined identifier of the device 116, for example, to establish a wireless connection between the device 100 and the device 116, as indicated by arrow 136. The wireless connection may be based on ultrasound signals (e.g., waves) using a coded chirp (e.g., an ultrasound communication protocol) and/or communication protocol to send and receive information 120 back and forth amongst devices within range of a particular physical space. In some implementations, the wireless connection may instead be radio frequency wireless signals such as Bluetooth, Wi-Fi, or other wireless communication protocol.

Once the wireless connection is established between one or more devices (e.g., device 100 and device 116), the device 100 may cause a retrieval of information 120 from the wearable computing device 116 (or other computing device associated with a particular physical space) using the wireless connection. The device 100 may also trigger presentation of the information 120 on a screen 104 (e.g., a display), as shown by example content 102A and example content 102B.

In some implementations, the information 120 may include a mapping 122 of the physical space. The information for the mapping 122 may be obtained based on devices within a predetermined range of one another are configured with one or more respective microphones that are either always on or in a wakeup mode. The microphones may be ready to detect any particular ultrasound signals (e.g., chirps). In some implementations, a wearable computing device may pan a room while emitting an ultrasound signal to trigger a responder wearable computing device to respond to the signal with identifier information. The transmitting wearable computing device can recognize and differentiate responding devices. The ToF metric of one or more sent signals and/or directionality information may be used to generate the mapping 122 of each device and/or object in the physical space, for example.

While display screen representations are not depicted for devices 116, 128, and 130, each of devices 116, 128, and 130 may view content similar to the content shown in display screen 104, but such content will be configured for each particular device according to user configured settings, permissions, and/or device capabilities.

Figure 2:
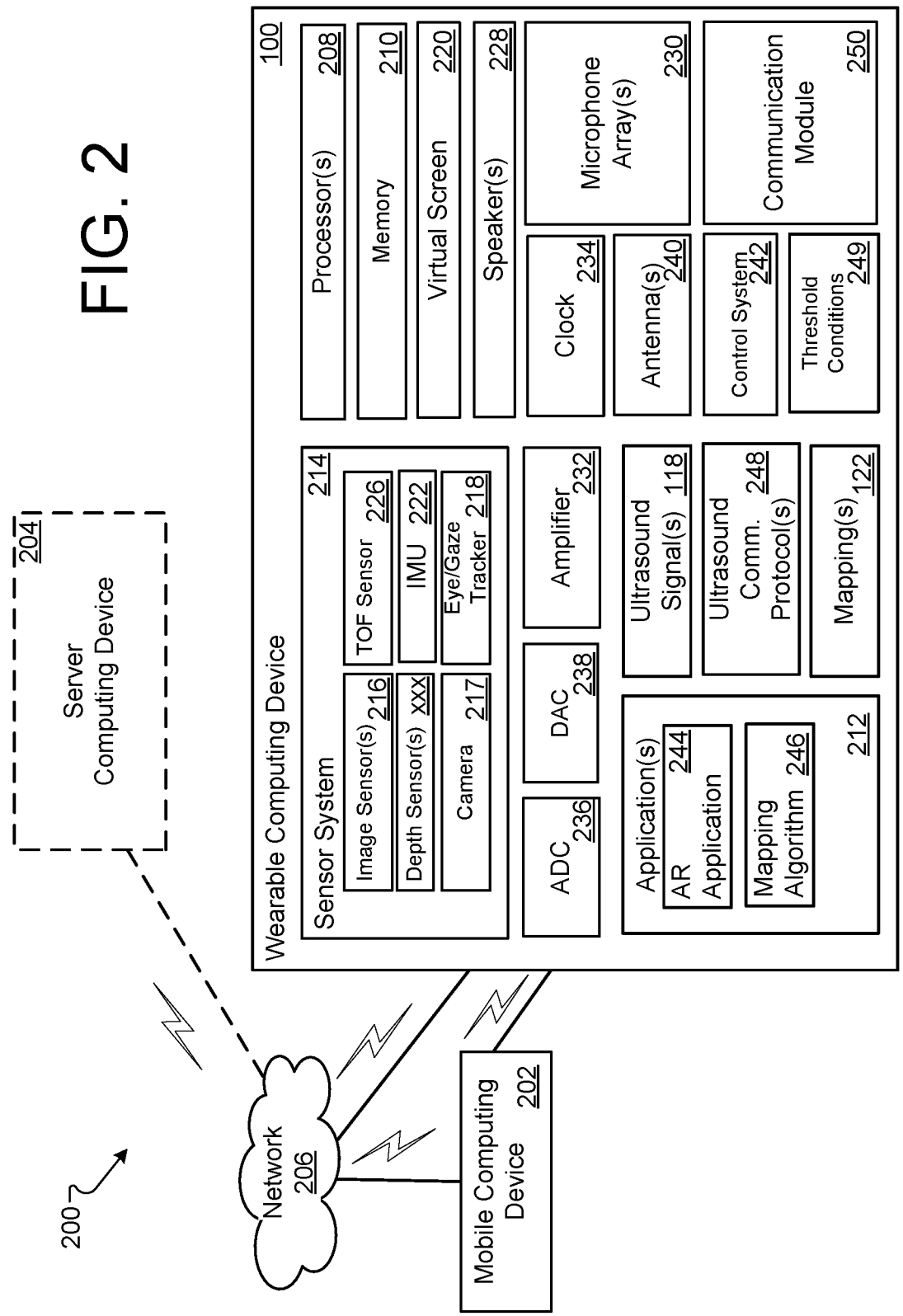
FIG. 2 illustrates a system for facilitating communication between multiple wearable computing devices, according to implementations described throughout this disclosure.

FIG. 2 illustrates a system 200 for performing ultrasound signal processing on a wearable computing device 100, according to implementations described throughout this disclosure. In some implementations, the ultrasound signal processing is performed on the wearable computing device 100 configured as a transceiver device. In some implementations, the ultrasound signal processing is performed on a wearable computing device that is configured as a receiver device. In some implementations, the ultrasound signal processing is performed on a wearable computing device that is configured as a transmitter device.

In some implementations, the ultrasound signal processing and/or ultrasound communications are performed on one device, such as wearable computing device 100, a mobile computing device 202 (e.g., such as mobile computing device 126) and/or server computing device 204. In some implementations, the ultrasound signal processing and/or ultrasound communications are performed on the wearable computing device 100 and output from such processing is provided to the mobile computing device 202 and/or the server computing device 204.

In some implementations, the wearable computing device 100 includes one or more computing devices, where at least one of the devices is a display device capable of being worn on or in proximity to the skin of a person. In some examples, the wearable computing device 100 is or includes one or more wearable computing device components. In some implementations, the wearable computing device 100 may include a head-mounted display (HMD) device such as an optical head-mounted display (OHMD) device, a transparent heads-up display (HUD) device, a virtual reality (VR) device, an AR device, or other devices such as goggles or headsets having sensors, displays, and computing capabilities. In some implementations, the wearable computing device 100 includes AR glasses (e.g., smart glasses). AR glasses represent an optical head-mounted display device designed in the shape of a pair of eyeglasses. In some implementations, the wearable computing device 100 is or includes a smart watch. In some implementations, the wearable computing device 100 is or includes a piece of jewelry. In some implementations, the wearable computing device 100 is or includes a ring controller device or other wearable controller. In some implementations, the wearable computing device 100 is or includes earbuds/headphones or smart earbuds/headphones.

As shown in FIG. 2, the system 200 includes the wearable computing device 100 communicably coupled to a mobile computing device 202 and a server computing device 204, each connection being optional. In some implementations, the communicable coupling may occur via a network 206. In some implementations, the communicable coupling may occur directly between wearable computing device 100, mobile computing device 202, and/or server computing device 204.

The wearable computing device 100 includes one or more processors 208, which may be formed in a substrate configured to execute one or more machine executable instructions or pieces of software, firmware, or a combination thereof. The processors 208 can be semiconductor-based and may include semiconductor material that can perform digital logic. The processor 208 may include CPUs, GPUs, and/or DSPs, just to name a few examples.

The wearable computing device 100 can also include one or more memory devices 210. The memory devices 210 may include any type of storage device that stores information in a format that can be read and/or executed by the processor(s) 208. The memory devices 210 may store applications 212 (e.g., modules) that, when executed by the processor(s) 208, perform certain operations. In some examples, the applications 212 (e.g., modules) may be stored in an external storage device and loaded into the memory devices 210. The memory 210 may include or have access to any number of hardware and software components associated with device 100, for example, to store and retrieve data for the device 100.

The wearable computing device 100 includes a sensor system 214. The sensor system 214 includes one or more image sensors 216 configured to detect and/or obtain image data. In some implementations, the sensor system 214 includes multiple image sensors 216. The image sensor 216 may capture and record images (e.g., pixels, frames, and/or portions of images) and video. In some implementations, the image sensor 216 is or includes a red, green, blue (RGB) camera 217. In some examples, the image sensor 216 includes a pulsed laser sensor (e.g., a LiDAR sensor) and/or depth camera. For example, the image sensor 216 may be one or more cameras configured to detect and convey information used to make an image. In some implementations, the image sensor 216 is an eye tracking sensor (or camera), such as eye/gaze tracker 218 that captures movements of an eye of a user accessing device 100, for example.

The eye/gaze tracker 218 includes instructions stored in the memory 210 that, when executed by the processors 208, cause the processors 208 to perform the ultrasound processing operations described herein. For example, the eye/gaze tracker 218 may determine a location on a virtual screen 220 at which the user's gaze is directed. The eye/gaze tracker 218 may make this determination based on identifying and tracking the location of the user's pupils in images captured by an imaging device (e.g., sensor 216 and/or camera 217) of the sensor system 214.

The sensor system 214 may also include an inertial motion unit (IMU) sensor 222. The IMU sensor 222 may detect motion, movement, and/or acceleration of the wearable computing device 100. The IMU sensor 222 may include various different types of sensors such as, for example, an accelerometer, a gyroscope, a magnetometer, and other such sensors. In some implementations, the sensor system 214 may include screen embedded sensors that may detect particular user actions, motions, etc., directly from the virtual screen 220.

The camera 217 is capable of capturing still and/or moving images. In some implementations, the camera 217 may be a depth camera with one or more depth sensors 224 that can collect data related to distances of external objects from the camera 217. In some implementations, the camera 217 may be a point tracking camera that can, for example, detect and follow one or more optical markers on an external device, such as, for example, optical markers on an input device or finger on a screen.

In some implementations, the sensor system 214 includes a time-of-flight (ToF) sensor 226 configured to detect audio received by wearable computing device 100. The ToF sensor 226 may be used to determine a location of a particular wearable computing device (or other computing device within a particular physical space) by calculating a time of the ultrasound signal from its time of arrival at a second device with respect to its time of transmission from a first device (e.g., device 100). In particular, a time-of-departure of an ultrasound signal (e.g., a data packet, one or more chirps, etc.) from device 100 may be determined (e.g., measured) by ToF sensor 226. The time-of-arrival of an acknowledgment signal (e.g., an ultrasound signal, an acknowledgment data packet, one or more acknowledgement chirps, etc.) may be determined (e.g., measured). The ToF sensor 226 may use the time-of-departure and the time-of-arrival measurements to calculate the time-of-flight.

The sensor system 214 may include other types of sensors such as a light sensor, a distance and/or proximity sensor, a contact sensor such as a capacitive sensor, a timer, and/or other sensors and/or different combination(s) of sensors. The sensor system 214 may be used to obtain information associated with a position and/or orientation of wearable computing device 100. In some implementations, the sensor system 214 also includes or has access to an audio output device (e.g., one or more speakers 228) that may be triggered to output audio content. In some implementations, the sensor system 214 also includes or has access to an audio input device (e.g., microphone(s) and/or microphone array 230.

The microphone array 230 may be configured to capture audio signals that include sounds from around a user wearing a wearable computing device. For example, device 100 may include a number of microphones in the form of arrays 230, for example that may be configured to detect audible and inaudible sounds. The inaudible sounds (e.g., ultrasound signals) may be generated by transducers (not shown) associated with speakers 228, for example. The signals may be detected by the microphone arrays 230.

In some implementations, the microphone array 230 may include a plurality of microphones (not shown) that are each configured to convert sounds from the environment to an audio stream (i.e., audio channel). Each microphone can be omnidirectional so that, individually, sounds from all directions are sensed with the same sensitivity. While each microphone may have an omnidirectional sensitivity to the sounds in the environment, the microphone array may have a sensitivity that is directional. Beamforming may be used on the channels to filter and direct particular audible or inaudible sounds toward particular other devices in a physical space.

The wearable computing device 100 may include a number of hardware components to transmit and receive ultrasound signals 118 and/or other signals between devices described herein. For example, the device 100 may function in a transmitter mode that utilizes processors 208, speakers 228, and microphone arrays 230, an amplifier 232, a clock 234, analog to digital converter (ADC) 236, and digital to analog converter (DAC) 238, among other devices shown in FIG. 2. In operation, the clock 234 may function to drive one or more processors 208 to execute circuitry of device 100 and to track time during operations executed by device 100. The processor 208 has access to memory 210, which may be configured to store any or all of ultrasound signals 118. The processor 208 may perform computations using memory 210, and/or sensors of sensor system 214 to detect, generate, transmit, and receive ultrasound signals and related content carried by such signals 118.

The DAC 238 may be configured to receive ultrasound signals 118 and convert a digital representation of ultrasound signals 118 to an analog representation of ultrasound signals 118. The DAC 238 may provide such signals to the amplifier 232. The amplifier 232 may broadcast the analog representation to speakers 228. In some implementations, the device 100 may measure ToF (and related distances to other devices) based on transmitted and/or received ultrasound signals 118. For example, the processors 208 may determine such distance by measuring propagation delay based on a transmitted ultrasound signal sent to one or more other devices. In particular device 100 may receive an acknowledgement ultrasound signal at microphone arrays 230, for example. The microphone arrays 230 may provide the signal to the ADC 236. The ADC 236 may digitize the received signal and provide the digitized signal to the processors 208.

The wearable computing device 100 may also function in a receiver mode. In the receiver mode, the microphone arrays 230 may receive ultrasound signals transmitted from another device. The received ultrasound signals may be digitized by the ADC 236, processors 208 may generate acknowledgement signals, and sensor system 214 may determine or calculate mappings 122, and/or locations of devices. Other components such as demodulators, modulators, RF signals, decoders, encoders, antennas 240, controls system 242, and the like may also be used to generate, transmit, process, and receive ultrasound signals.

In operation, the speakers 228 may trigger transducers (not shown) to emit a sound pulse (e.g., an ultrasound signal). The device 100 may then wait to receive an echo returning from a device or object the sound pulse may have bounced from. The emitted sound pulse may be an inaudible chirp signal generated using an ultrasound communication protocol 248. In some implementations, the chirp signal may be configured to emit for a predefined amount of time generated according to particular predefined threshold conditions 249. For example, the chirp signal may emit for about one millisecond. The emitted chirp signal may include any number of pulses at any number of ultrasonic frequencies. The device 100 may receive the echo from one or more objects or devices and may determine an elapsed time between transmission of the chirp signal and the echo detection. The elapsed time may be converted into a distance with respect to the speed of sound. The distance may represent the distance from device 100 to the detected object or device that caused the echo.

The predefined threshold conditions 249 may pertain to a selected frequency of the ultrasound signals (e.g., the chirp signals). For example, the frequency may be selected such that objects within a predefined threshold distance (e.g., condition 249) may generate an echo within a specific amount of time. Other echoes received after the time may be deemed as not part of the physical space of interest to device 100. Thus, devices that produce echoes after the threshold time may not be part of a particular meeting of other wearable computing devices in a particular room.

The ultrasound communication protocol 248 may define which frequencies in which to send signals. The protocol 248 may also define a number of pulses to send. The protocol 248 may also define the packets of signals. The protocol 248 may be configured for moving users, static users, moving objects, static objects, and/or may be configured for specific device or object configurations.

The wearable computing device 100 may include a virtual screen 220 (e.g., a display). The virtual screen 220 may include a liquid crystal display (LCD), a light-emitting diode (LED) display, an organic light-emitting display (OLED), an electrophoretic display (EPD), or a micro-projection display adopting an LED light source. In some examples, the virtual screen 220 is projected onto the field of view of the user. In some examples, in the case of AR glasses, the virtual screen 220 may provide a transparent or semi-transparent display such that a user wearing the AR glasses can view images provided by the virtual screen 220 but also information located in the field of view of the AR glasses behind the projected images. In some implementations, the virtual screen 220 represents a virtual monitor that generates a larger screen image than is physically present. In some implementations, virtual screen 220 is a separate display device communicably coupled to the wearable computing device 100.

The wearable computing device 100 may also include one or more antennas 240 configured to communicate with other computing devices via wireless signals. For example, the wearable computing device 100 may receive one or more wireless signals and use the wireless signals to communicate with other devices such as mobile computing device 202 and/or server computing device 204, or other devices within range of antennas 240. The wireless signals may be triggered via a wireless connection such as a short-range connection (e.g., Bluetooth connection or near-field communication (NFC) connection) or an Internet connection (e.g., Wi-Fi or mobile network). In some implementations, the ultrasound signals 118 take the place of antennas 240 when communicating information, mappings 122, or other content between devices of FIG. 1, for example.

The wearable computing device 100 may also include a control system 242 that may include various control system devices to facilitate operation of the wearable computing device 100. The control system 242 may utilize processors 208, sensor system 214, or other devices operably coupled to the components of the wearable computing device 100.

The applications 212 may include AR application 244. The AR application 244 may be provided with sensory data from sensor system 214, which captures sensory data from an environment around a user wearing the wearable computing device 100. Based on the sensory data, the AR application 244 can generate virtual elements to enhance (i.e., augment) the user's perceptual experience. For example, the AR application 244 may be configured to generate sound (e.g., tone, music, speech, etc.) and/or display a visual (e.g., graphic, text, color, etc.) as virtual elements to add information to the user's perceived environment. Accordingly, the AR application 244 may be communicatively coupled with the virtual screen 220 and speakers 228 (e.g., earbuds, headphones, speakers) to merge (e.g., overlay) the virtual elements with the real environment (e.g., a physical space). A gaze direction or focus point may configure the AR application to alter an output (i.e., AR data) according to the gaze direction. For example, the eye/gaze tracker 218 may detect a gaze direction as a basis in which to transmit or await receiving a particular signal. The transmitted and/or received signal may include an ultrasound signal that provides information that may be used by the AR application 244 to generate sound or display content for a user wearing a wearable computing device.

The applications 212 include mapping algorithms 246 may function to use ultrasound signals to determine a location for each object and device within a physical space. The mapping algorithms 246 may use the locations to generate a map representing the physical space. The map may store information about each object and device in the physical space. Example information may be user configured and based on user permissions and/or system configured and may include, but is not limited to locations within the physical space, object identifiers, connection status, online status, activity status (e.g., in a meeting, moving, etc.), calendar schedule (based on user permissions), electronic business cards, payment data (based on user permissions), microphone status, online status, signal strength, eye gaze status, etc.

Although not explicitly shown, the applications 212 (e.g., including AR application 224 and/or mapping algorithm 246), and/or data associated therewith, may be stored and/or processed locally on the wearable device 100, on the mobile computing device 202 (e.g., phone), and/or in the computing device 204 (e.g., server). Moreover, many of the processing functions and/or components (in whole, or in part) illustrated (and described) as being included in the wearable computing device 100 can be handled at and/or may be included in the mobile computing device 202 and/or server computing device 204.

The mapping algorithm 246 may be carried out based on data sent and/or received using ultrasound signals passed amongst one or more wearable computing devices (or other computing devices) within a physical space. The mapping algorithm 246 may track and/or calculate times associated with ultrasound signal transmit and receive operations. For example, the mapping algorithm 246 may track ultrasound signals sent amongst wearable computing devices (or other computing devices) in a physical space. The tracking may include determining transmission, arrival, and acknowledgement times to calculate particular ToF metrics for particular ultrasound signals. For example, the processors 208 may use data from the ToF sensor 226 to determine a distance between device 100 and devices 116, 124, 126, 128, and 130 (FIG. 1) by measuring propagation delay based on at least one transmitted ultrasound signal sent from device 100 and received at each of devices 116, 124, 126, 128, and 130. That is, each device 116, 124, 126, 128, and 130 (as well as objects in the physical space surrounding such devices) may receive at least one signal from device 100 and may trigger an echo signal. The round trip time of the sending of the at least one ultrasound signal and the receipt of the resulting echo signal(s) may be used with a determination of particular angles and directions from which the echo signal(s) is received may be used to determine location and distance of each device with respect to the device 100. The angles, location, directions, etc. may be used as a basis for continuing communications between wearable computing devices (or other devices) in a physical space.

For example, the mapping 122 may represent a responder mapping. That is, for each responding device, the mapping 122 may include data representing the angles of receipt of echo signals, the distances from device to device, the gaze directions (e.g., associated with an eye gaze of the transmitting device and/or related fields of view of the transmitting device). Such signals and metrics may be used to trigger particular messages, data, handshaking, etc. to be generated by a transmitting device and received by specific receiving devices. For example, if the mapping 122 indicates for user 108 (e.g., device 116) a location, an angle of receipt of an echo signal, and a generate direction in which the echo signal originated, the device 100 may also correlate an eye gaze of the user 106 with a direction (e.g., a field of view).

In some implementations, the eye gaze of the user 106 may be a trigger to send private or particular communications in the direction of the user within the field of view. In this example, the user 106 is gazing at user 116. Users 110, 112, and 114 may be configured to receive particular group messaging but may not be configured to receive a particular message unless the user gazes at the other users 110, 112, and 114. However, since the user 106 is gazing at user 108, device 100 may transmit, via ultrasound signals, an action item to device 116, based on the direction of the eye gaze. In some implementations, the trigger for sending the action item may be based on the user 106 providing a specific input at device 100 to direct action items to a closest user or a user within a field of view.

The wearable computing device 100 may also include a communication module 250. The communication module 250 may enable the wearable computing device 100 to communicate to exchange information with another computing device within range of the device 100. For example, the wearable computing device 100 may be operably coupled to another computing device, to facilitate communication via, for example, a wired connection, a wireless connection via for example, an ultrasound connection, a Wi-Fi or Bluetooth connection, or other type of connection.

In some implementations, the wearable computing device 100 is configured to communicate with the server computing device 204 and/or the mobile computing device 202 over the network 206. The server computing device 204 may represent one or more computing devices that take the form of a number of different devices, for example a standard server, a group of such servers, or a rack server system. In some implementations, the server computing device 204 is a single system sharing components such as processors and memories. The network 206 may include the Internet and/or other types of data networks, such as a local area network (LAN), a wide area network (WAN), a cellular network, satellite network, a point-to-point network, or other types of data networks. The network 206 may also include any number of computing devices (e.g., computer, servers, routers, network switches, etc.) that are configured to receive and/or transmit data within network 206 via RF or ultrasound.

Figure 3:
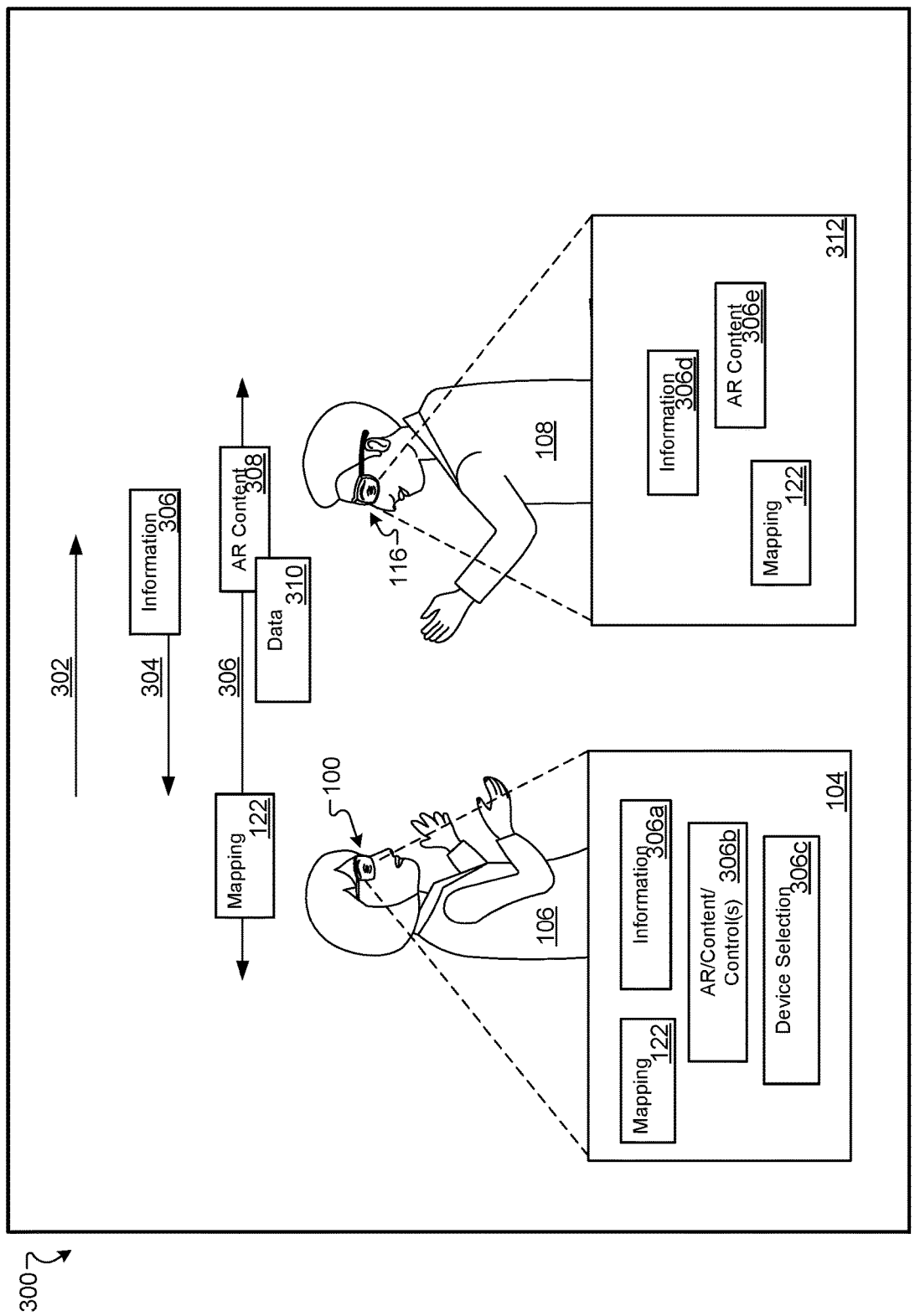
FIG. 3 illustrates an example of a first wearable computing device communicating with a second wearable computing device using inaudible signals, according to implementations described throughout this disclosure.

FIG. 3 illustrates an example of a first wearable computing device communicating with a second wearable computing device using inaudible signals in a physical space 300, according to implementations described throughout this disclosure. For example, the user 106 and user 108 may be in a same physical space 300 and wearing respective wearable computing devices 100, 116. The device 100 (e.g., a host) may emit (e.g., transmit) a first ultrasound signal 302.

In some implementations, the device 100 initiates the first signal 302 using an audible command (e.g., a cue word or phrase), a touch sensor input (e.g., via a microelectromechanical sensor onboard device 100), a head gesture detected by device 100, and the like.

The device 116 (e.g., a responder) may receive the first ultrasound signal 302 and may respond with an inaudible (e.g., another ultrasound) signal 304. The response signal 304 from device 116 may include identifier information 306 associated with device 116. The device 100 may receive the response signal 304 and may identify a location of the device 116 in the physical space. The location of device 116 may be determined based on a determined time of flight of the first signal 302, calculated at the device 100. In some implementations, a directional heading of the device 116 can be captured via inertial navigation sensors (not shown) on device 100.

The device 100 may trigger establishment of a wireless connection between the device 100 and the device 116 based on the identifier information 306 and the determined location of device 116. In some implementations, the wireless connection is according to the ultrasound communication protocol 248. In the event that other responder devices are in the physical space (e.g., device 100 received multiple responses from multiple devices), the device 100 may provide one or more selections on a display screen 104 of device 100 to allow the user of device 100 to pick and choose which devices in which to wirelessly connect, as shown by device selection 306c. In some implementations, the device 100 may instead determine which responder device in which to wirelessly connect using threshold conditions 249 including, but not limited to a determined device distance from device 100, a gaze direction of device 100, a prior communication between device 100 and another device in the physical space, etc. For example, the device 100 may algorithmically select which device in which to wirelessly connect by determining times of flight, directions, device 100 gaze direction with respect to other devices, etc.

In some implementations, the device 100 may use eye/gaze tracker 218 to determine where an ultrasound signal originated in order to communicate back to the device (and/or continue communicating with the device). For example, two users may wish to communicate back and forth using their respective wearable electronic devices. In some implementations, identifying the location of device 116 with respect to device 100 may additionally be based on a detected eye gaze direction associated with device 100. For example, eye/gaze tracker 218 may detect a direction in which the user of device 100 is looking. The direction may be a basis for selecting another device in which to establish the wireless connection. For example, if the eye/gaze tracker 218 determines that the eye gaze of the user of device 100 is looking at a user other than user 108, the device 100 may instead wirelessly connect to a different user that is determined to be associated with the eye gaze.

In some implementations, establishing the wireless connection between the first wearable computing device 100 and the second wearable computing device 116 may be further based on the detected eye gaze and may trigger presentation of information 306a AR content 306b in respective screen 104 associated with device 100 and/or information 306d and/or AR content 306e in display screen 312 associated with device 116. For example, the wireless connection may be established based on the eye gaze detection and the connection may trigger presentation of a control in the display (e.g., screen 104) that is associated with the device 100. The control may include one or more options to begin an audio or video call with the device 116, for example.

Once the wireless connection is established between device 100 and any number of devices, the device 100 may trigger retrieval of information from one or more of the connected devices. The information may then be displayed on device 100. In some implementations, similar or identical information may additionally be provided to other connected devices within the physical space based on user permissions to use and share such data, for example. In one example, the information may include augmented reality (AR) content depicting credentials associated with a user of the connected device. For example, the information that may be triggered for sharing and presentation on device 100 and pertaining to user 108 using device 116 may include business card data (or resume, CV, biography data, etc.) that includes user credentials, such as an employer, a title, contact information, or other user data that user 106 has provided permission to exchange. The retrieval of the information may also trigger transmission from device 100, similar information to share with the user 108 of device 116. Such an exchange of data 310 may take the place of swapping business cards (or resumes, CVs, biography data, etc.). Both devices 100 and device 116 may store the exchanged information and may present such information on respective display screens as AR content 308. Displaying the AR content 308 may assist each user to recall information about the other user. For example, if both users approach one another at an event, the device 100 and device 116 may begin an exchange of ultrasound signals that result in obtaining basic information about each user which may be conveniently displayed as AR content 308 on respective screens of devices 100, 116. Each user may benefit from the shared information in the event that another user has forgotten a business detail or name associated with the other user. In some implementations, the AR content 308 may include controls and actionable content in which a user of device 100, for example, may select to trigger actions including, but not limited to phone calls, video calls, meeting request generation, document sharing, electronic signature capturing/signing, email generation, and/or other information sharing tasks.

In some implementations, a user may configure a wearable computing device 100 with permissions for sharing or not sharing particular data. For example, within a physical location, the user 100 may provide permission for sharing selected data for a particular amount of time. In particular, if the user is at a social event, the user may wish to be discoverable for a particular amount of time for other users donning wearable computing devices or users having non-wearable devices that are configured to communicate ultrasonically with the wearable computing devices. Upon expiration of the time period (or upon explicit user request), a wearable computing device may disallow sharing of data and/or discovery of the wearable computing device.

Figure 4:
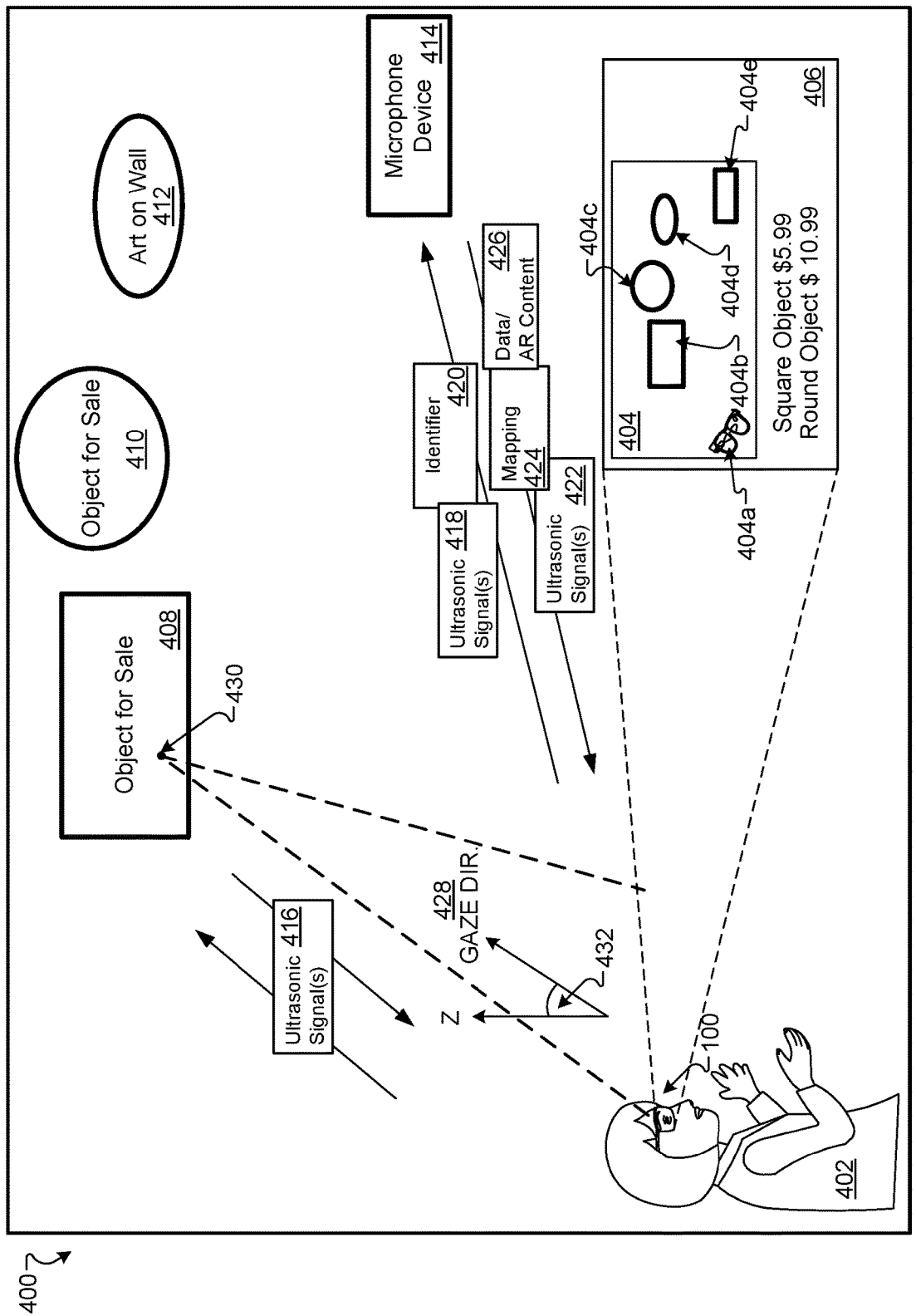
FIG. 4 illustrates an example of using inaudible signals to communicate to obtain information from a physical space, according to implementations described throughout this disclosure.

FIG. 4 illustrates an example of using inaudible signals to communicate to obtain information from a physical space, according to implementations described throughout this disclosure. In this example, a user 402 may walk into a physical space 400 (e.g., a retail space, a commercial space, a workplace, etc.). The user 402 may be directed toward regions of the physical space and/or may be provided particular information about specific objects in the physical space. For example, the user 402 may be wearing device 100 and may transmit an ultrasound signal to one or more listening devices (e.g., microphones on assistant devices, other wearable computing devices with microphones within the room, etc.). The one or more listening devices may receive the ultrasound signal and may respond with information back to device 100. In some implementations, the listening devices may be associated with particular objects and may be continuously transmitting ultrasound signals (e.g., chirp signals). In some implementations, the listening devices may wake up and transmit ultrasound signals when detecting optical information, such as a user waking into space 400.

The information provided back to device 100 via ultrasound may include data about specific items in the physical space, messages or locations in spaces that the user 402 enters, pricing data, object details, instructions, and the like. As shown, the information may include data about objects for sale, such as square object 408 and round object 410, as well as other points of interest in the room (e.g., art 412, microphone device 414). The device 100 may determine and/or derive location information from multiple microphones in the physical space, for example, in order to determine locations of objects, other devices, microphone devices, etc. The determined locations may be used to generate a mapping, such as mapping 404, shown in virtual screen 406 of device 100.

In some implementations, the device 100 may generate one or more ultrasonic signals 416, which may trigger objects and devices in space 400 to bounce echo signals from each object 408, 410, and 412, as well as microphone device 414. The echo signal may be used to generate all or portions of mapping 404. In some implementations, the device 100 may emit one or more ultrasonic signals 418 to device 414 where the signal includes at least the device identifier 420. Device 414 may respond with ultrasonic signals 422, which may include the mapping 424 (which may represent mapping 404), and/or other data or AR content 426.

In some implementations, a gaze direction 428 of the user 402 and/or a resulting field of view and/or point of interest 430 may be taken into account when sending ultrasonic signals 416 and/or 418. If the device 100 determines that the gaze direction 428 results in viewing point of interest 430 (or a point of interest near point of interest 430), the ultrasonic signal 416 may be directed toward the object 408 for sale with the identifier information 420. The identifier information and/or other information configured in the ultrasonic signal 416 may be recognized by a particular microphone device 414, which may, in turn, send a second ultrasonic signal providing information to device 100. The information may include information about physical space 400, such as mappings 424, data and/or AR content 426, or other information via ultrasonic signals 416.

In some implementations, the eye/gaze tracker 218 may assess a field of view and eye gaze direction 428 to determine depth data, coordinate systems for frames of references, and/or to configure mappings of the space. In general, the eye gaze direction 428 may represent an angle 432 relative to the coordinate system of device 100, and the focus point 430 may be a point relative to the coordinate system of device 100.

In some implementations, the mapping 404 may be generated by device 100. In some implementations, the mapping 404 may be received by device 414, for example, and then updated by device 100 and resent to other devices in the space 400. As shown, the mapping 404 includes a mapped location of the user 404a, and the four items of interest from space 400 shown by map objects 404b, 404c, 404d, and 404e.

In operation, the device 100 (e.g., a host) may emit (e.g., transmit) a first ultrasound signal 418 into space 400 as the user enters space 400. In some implementations, the transmitting of the first ultrasound signal 418 is triggered based on detecting, by the first wearable computing device, entry into the physical space 400. The space 400 may also be configured to emit ultrasound signals that include additional information upon detecting user entry (e.g., device 100 entry) into space 400. For example, a handshaking process between device 100 and a listening device (e.g., device with a microphone) in space 400. The handshaking process may be used to establish a wireless connection between device 100 and one or more listening devices within space 400. In some implementations, the additional information may include data associated with at least one object in the physical space, such as object details and pricing for the object. In short, device 100 may use inaudible chirp information via ultrasound signals to communicatively connect to devices within physical space 400 and/or to receive information about physical space 400.

A microphone device 414 (e.g., a responder) may receive the first ultrasound signal 418 and may respond with an inaudible (e.g., another ultrasound) signal 422. The response signal 422 may include identifier information, mappings 424, data and/or AR content 426 or other data requested by device 100. The device 100 may receive the response signal 422 and may identify a location of the device 414 in the physical space 400. The location of device 414 may be determined based on a determined time of flight of the first signal 418, calculated at the device 100.

The device 100 may trigger establishment of a wireless connection between the device 100 and the device 414 based on the identifier information 420 and the determined location of device 414. In some implementations, the wireless connection is according to the ultrasound communication protocol 248. In some implementations, the device 100 may use eye/gaze tracker 218 to determine where an ultrasound signal originated in order to communicate back to the device 414 (and/or continue communicating with the device 414).

Once the wireless connection is established between device 100 and any number of devices of space 400, the device 100 may trigger retrieval of information from one or more of the connected devices. The information may then be displayed on device 100, by a virtual screen 406, for example.

Figure 5:
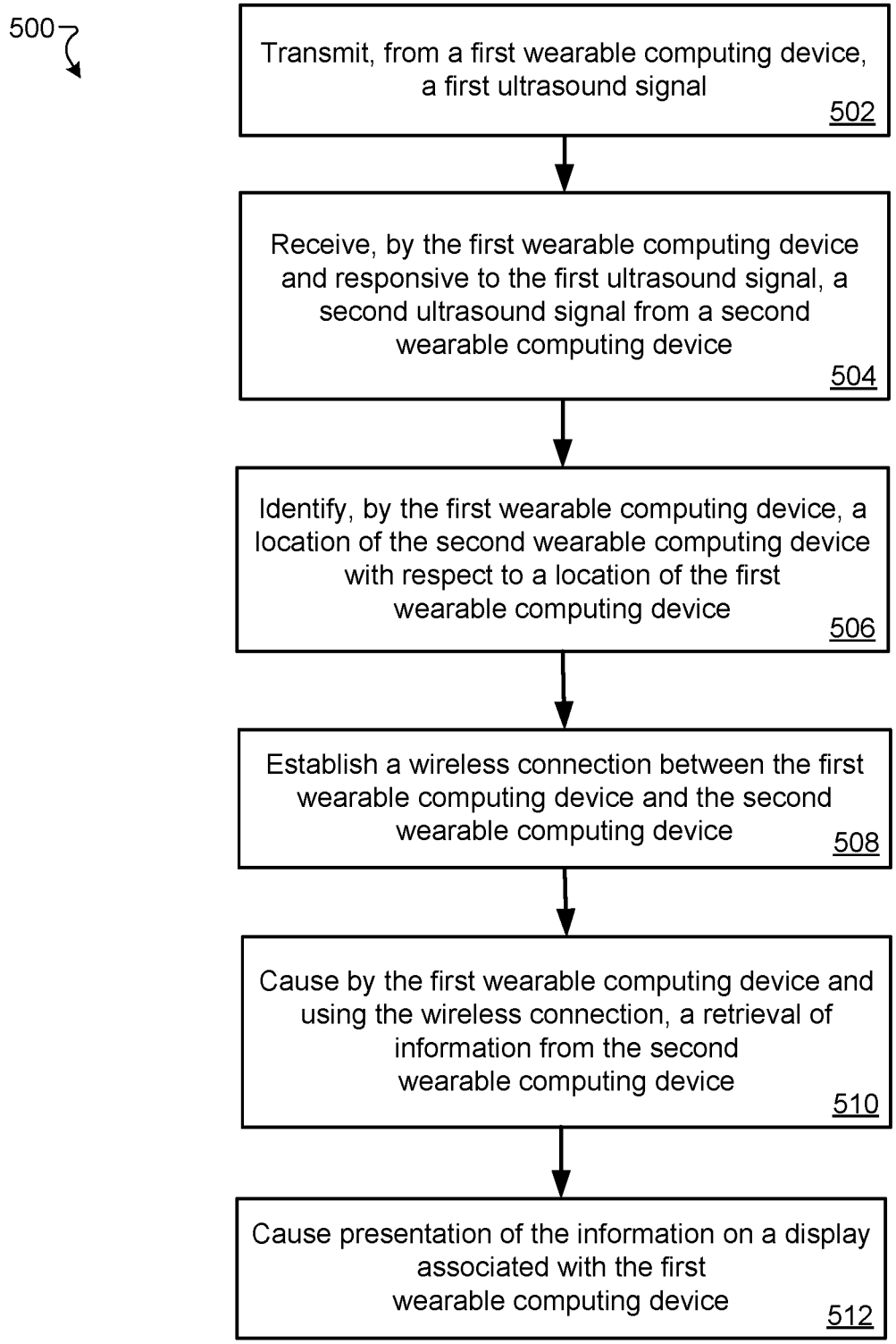
FIG. 5 is a flow chart diagramming one example of a process to use inaudible signals to communicate between devices, according to implementations described throughout this disclosure.

FIG. 5 is a flow chart diagramming one example of a process 500 to use inaudible signals to communicate between computing devices, according to implementations described throughout this disclosure. In some implementations, the computing device is a wearable computing device that is battery-powered. In some implementations, the computing device is a wearable computing device that is not battery-powered (e.g., plugged into an outlet and/or host device (e.g., a master device, a hub device in a meeting room)). In some implementations, the computing device is a non-wearable computing device that is battery-powered or not battery-powered.

The process 500 may utilize a signal processing system on a computing device that includes at least one processing device, at least one speaker, at least one microphone, optional display capabilities, one or more ADCs, DACs, and/or amplifiers, and memory storing instructions that when executed cause the processing device to perform the plurality of operations and computer implemented steps described in the claims. In general, the computing device 100, systems 200, and/or 600 may be used in the description and execution of process 500. The combination of device 100 and systems 200 and/or 600 may, in some implementations, represent a single system. In general, process 500 utilizes the systems and algorithms described herein to distinguish a direction and arrival of inaudible (e.g., ultrasonic) sound in order to enable communication amongst wearable computing devices.

At block 502, the process 500 may include transmitting, from a first wearable computing device, a first ultrasound signal. For example, the user 106 and user 108 may be in a same physical space and wearing respective wearable computing devices 100, 116. The device 100 (e.g., a host) may emit (e.g., transmit) a first ultrasound signal 302 (e.g., ultrasound signal 118). In some implementations, the device 100 initiates the first signal 302 using an audible command (e.g., a cue word or phrase), a touch sensor input (e.g., via a microelectromechanical sensor onboard device 100), a head gesture detected by device 100, and the like.

At block 504, the process 500 may include receiving, by the first wearable computing device and responsive to the first ultrasound signal, a second ultrasound signal from a second wearable computing device. For example, the device 116 (e.g., a responder) may receive the first ultrasound signal 302 and may respond with an inaudible (e.g., another ultrasound) signal 304. The response signal 304 from device 116 may include identifier information 306 associated with device 116. Other information may also be provided with response signal 304 and received at device 100.

At block 506, the process 500 may include identifying, by the first wearable computing device, a location of the second wearable computing device with respect to a location of the first wearable computing device. The location of the second wearable computing device may be identified based on a determined time-of-flight of the first ultrasound signal. For example, the device 100 may receive the response signal 304 and may identify a location of the device 116 in the physical space. The location of device 116 may be determined based on a location of device 100 and a determined time of flight of the first signal 302, calculated at the device 100 by ToF sensor 226.

At block 508, the process 500 may include establishing a wireless connection between the first wearable computing device and the second wearable computing device. The wireless connection may be based at least in part on the identifier and the identified location associated with the second wearable computing device.

For example, the device 100 may trigger establishment of a wireless connection between the device 100 and the device 116 based on the identifier information 306 and the determined location of device 116 within space 300, for example. In some implementations, the wireless connection is according to the ultrasound communication protocol 248.

At block 510, the process 500 may include causing, by the first wearable computing device and using the wireless connection, a retrieval of information from the second wearable computing device. For example, once the wireless connection is established between device 100 and device 116 (or other devices in physical space 300 that are wirelessly connected to device 100), the device 100 may trigger retrieval of information from one or more of the wirelessly connected devices. For example, using the wireless connection according to the ultrasound communication protocol 248, device 100 may trigger via ultrasound signals, retrieval of information from another connected device.

At block 512, the process 500 may include causing presentation of the information on a display associated with the first wearable computing device. For example, device 100 may trigger the retrieved information to be displayed on a virtual screen associated with device 100 (e.g., virtual screen 220, shown as display screen 104 of FIG. 3).

In some implementations, similar or identical information may additionally be provided to and/or displayed on other connected devices within the physical space based on user permissions to use and share such data, for example. In one example, the information may include augmented reality (AR) content depicting credentials associated with a user of the connected device. For example, the information that may be triggered for sharing and presentation on device 100 and pertaining to user 108 using device 116 may include business card data (or resume, CV, biography data, etc.) that includes user credentials, such as an employer, a title, contact information, or other user data that user 106 has provided permission to exchange. The retrieval of the information may also trigger transmission from device 100, similar information to share with the user 108 of device 116. Such an exchange of data 310 may take the place of swapping business cards (or resumes, CVs, biography data, etc.). Both devices 100 and device 116 may store the exchanged information and may present such information on respective display screens as AR content 308.

In some implementations, the first ultrasound signal 302 is at least one inaudible chirp signal generated according to the ultrasound communication protocol 248 and the second ultrasound signal 304 is at least one inaudible chirp signal generated according to the ultrasound communication protocol 248 where the ultrasound communication protocol defines a relationship between frequency and time.

Examples described throughout this disclosure may refer to computer and/or computing systems. As used herein, a computer (and/or computing) system includes, without limitation, any suitable combination of one or more devices configured with hardware, firmware, and software to carry out one or more of the computerized techniques described herein. A computer (and/or computing) system as used herein may be a single computing device or multiple computing devices working collectively and in which the storage of data and the execution of functions are spread out amongst the various computing devices.

Examples described throughout this disclosure may refer to augmented reality (AR). As used herein, AR refers to a user experience in which a computer system facilitates a sensory perception that includes at least one virtual aspect and at least one aspect of reality. An AR experience can be provided by any of multiple types of computer system, including, but not limited to, a battery powered, wearable computing device or a battery powered, non-wearable computing device. In some implementations, a wearable computing device can include an AR headset which may include, but is not limited to, AR glasses, another wearable AR device, a tablet, a watch, or a laptop computer.

In some types of AR experiences, the user can perceive the aspect of reality directly with user senses without intermediation by the computer system. For example, some AR glasses, such as wearable computing device 100, are designed to beam an image (e.g., the virtual aspect to be perceived) to the user's retina while also allowing the eye to register other light that was not generated by the AR glasses. As another example, an in-lens micro display can be embedded in a see-through lens, or a projected display can be overlaid on a see-through lens. In other types of AR experiences, a computer system can improve, complement, alter, and/or enable the user's impression of reality (e.g., the real aspect to be perceived) in one or more ways. In some implementations, an AR experience is perceived on a screen of a computer system's display device. For example, some AR headsets and/or AR glasses are designed with camera feedthrough to present a camera image of the user's surrounding environment on a display device positioned in front of the user's eye.

Figure 6:
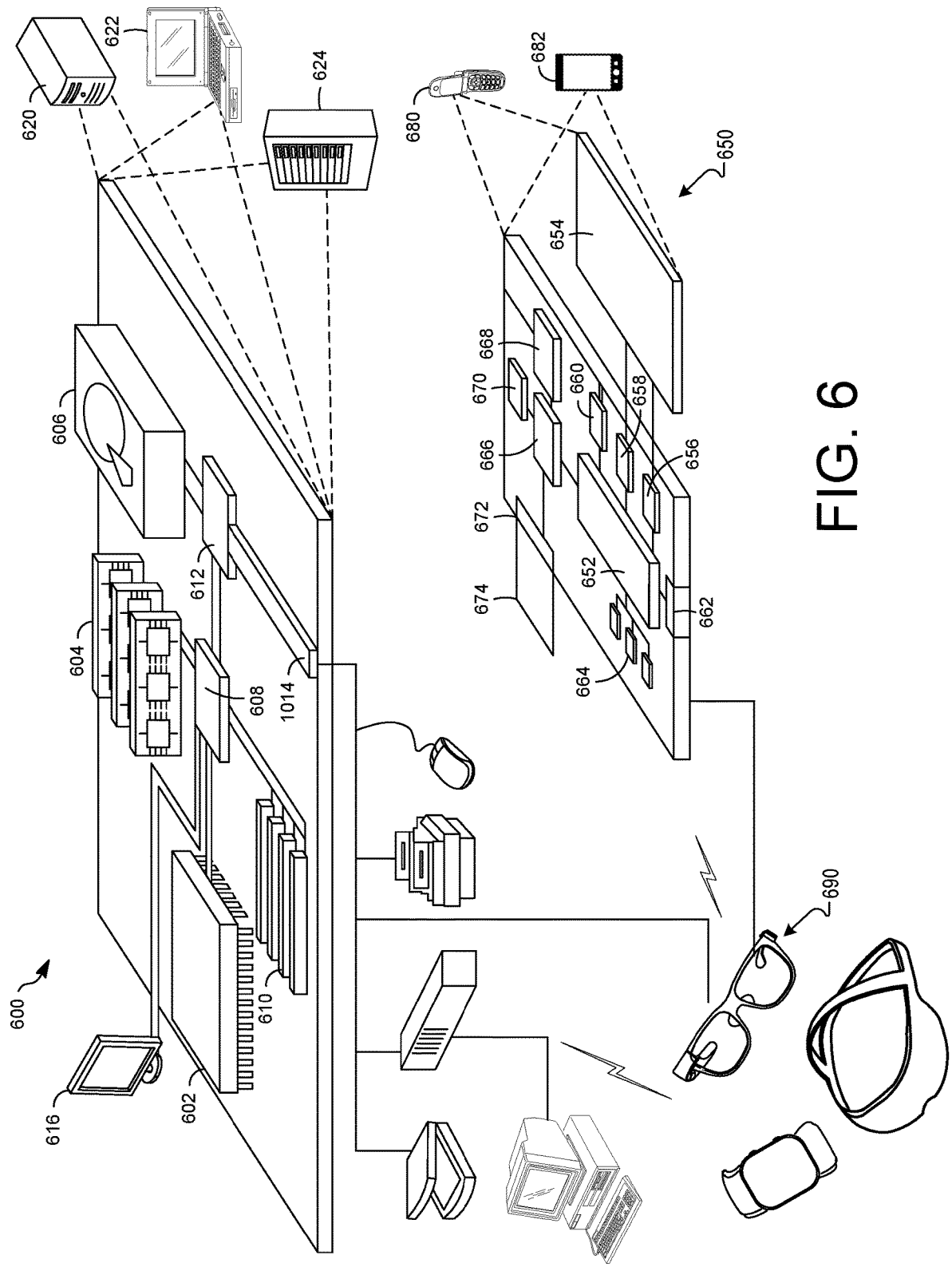
FIG. 6 illustrates an example of a computer device and a mobile computer device, which may be used with the techniques described herein.

FIG. 6 illustrates an example of a computer device 600 and a mobile computer device 650, which may be used with the techniques described here (e.g., to implement the client computing device 100, the mobile computing device 202, and/or the server computing device 204). The computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is exemplary. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display), and LED (Light Emitting Diode) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 690 to generate an augmented environment for viewing inserted content within the physical space. For example, one or more sensors included on a computing device 650 or other computing device depicted in the figure, can provide input to the AR headset 690 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the AR space that can then be used as input to the AR space. For example, the computing device 650 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space.

In some implementations, the AR headset/HMD device 690 represents device 60 and includes a display device (e.g., a virtual screen) that may include a see-through near-eye display such as those using birdbath or waveguide optics. For example, such an optical design may project light from a display source onto a portion of teleprompter glass functioning as a beamsplitter seated at a 45-degree angle. The beamsplitter may allow for reflection and transmission values that allow the light from the display source to be partially reflected while the remaining light is transmitted through. Such an optic design may allow a user to see both physical items in the world next to digital images (e.g., UI elements, virtual content, focus transition markers, etc.)

generated by the display. In some implementations, waveguide optics may be used to depict content on the virtual screen of device 690.

In some implementations, one or more input devices included on, or connected to, the computing device 650 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the AR space can cause a particular action to occur in the AR space.

In some implementations, a touchscreen of the computing device 650 can be rendered as a touchpad in AR space. A user can interact with the touchscreen of the computing device 650. The interactions are rendered, in AR headset 690 for example, as movements on the rendered touchpad in the AR space. The rendered movements can control virtual objects in the AR space.

In some implementations, one or more output devices included on the computing device 650 can provide output and/or feedback to a user of the AR headset 690 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the AR space. In the example of the laser pointer in an AR space, the computing device 650 appears as a virtual laser pointer in the computer-generated, 3D environment. As the user manipulates the computing device 650, the user in the AR space sees movement of the laser pointer. The user receives feedback from interactions with the computing device 650 in the AR environment on the computing device 650 or on the AR headset 690. The user's interactions with the computing device may be translated to interactions with a user interface generated in the AR environment for a controllable device.

In some implementations, a computing device 650 may include a touchscreen. For example, a user can interact with the touchscreen to interact with a user interface for a controllable device. For example, the touchscreen may include user interface elements such as sliders that can control properties of the controllable device.

Computing device 600 is intended to represent various forms of digital computers and devices, including, but not limited to laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the subject matter described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
   transmitting, from a first wearable computing device, a first ultrasound signal;
   receiving, by the first wearable computing device and responsive to the first ultrasound signal, a second ultrasound signal from a second wearable computing device, the second ultrasound signal including an identifier associated with the second wearable computing device;
   identifying, by the first wearable computing device, a location of the second wearable computing device with respect to a location of the first wearable computing device, the location of the second wearable computing device being identified based on a determined time-of-flight of the first ultrasound signal;
   establishing a wireless connection between the first wearable computing device and the second wearable computing device, the wireless connection based at least in part on the identifier and the identified location associated with the second wearable computing device;
causing, by the first wearable computing device and using the wireless connection, a retrieval of information from the second wearable computing device; and
causing presentation of the information on a display associated with the first wearable computing device.

2. The computer-implemented method of claim 1, further comprising:
generating, based on the determined time-of-flight, a mapping of a physical space, the mapping defining:
a location for a plurality of objects associated with the physical space,
the location of the first wearable computing device,
the location of the second wearable computing device, and
at least one location for any detected additional computing devices if additional ultrasound signals are received from respective detected additional computing devices; and
providing the mapping to the second wearable computing device; and
providing the mapping to the additional computing devices if the additional ultrasound signals are received.

3. The computer-implemented method of claim 2, further comprising:
in response to detecting an additional ultrasound signal from a third wearable computing device, updating the mapping to map the third wearable computing device and providing the updated mapping to each of the first, the second, and the third wearable computing devices, the updated mapping including, for each of the first, the second, and the third wearable computing devices, a location, a device identifier, and a plurality of options to communicate over the wireless connection.

4. The computer-implemented method of claim 1, wherein:
the first ultrasound signal is at least one inaudible chirp signal generated according to an ultrasound communication protocol; and
the second ultrasound signal is at least one inaudible chirp signal generated according to the ultrasound communication protocol, the ultrasound communication protocol defining a relationship between frequency and time.

5. The computer-implemented method of claim 1, wherein:
identifying, by the first wearable computing device, the location of the second wearable computing device with respect to the first wearable computing device is further based on a detected eye gaze direction associated with the first wearable computing device; and
establishing a wireless connection between the first wearable computing device and the second wearable computing device is further based on the detected eye gaze and triggers presentation of a control in the display associated with the first wearable computing device to begin an audio or video call with the second wearable computing device.

6. The computer-implemented method of claim 1, wherein:
the information includes augmented reality content depicting credentials associated with a user of the second wearable computing device; and
the retrieval of the information from the second wearable computing device triggers transmission, from the first wearable computing device to the second wearable computing device, respective credentials associated with a user of the first wearable computing device.

7. The computer-implemented method of claim 1, wherein the transmitting of the first ultrasound signal is triggered based on detecting a scheduled calendar event associated with an application of the first wearable computing device.

8. The computer-implemented method of claim 1, wherein establishing a wireless connection between the first wearable computing device and the second wearable computing device is further based on a detected eye gaze direction associated with the first wearable computing device.

9. The computer-implemented method of claim 1, wherein:
the transmitting of the first ultrasound signal is triggered based on detecting, by the first wearable computing device, entry into a physical space configured to emit ultrasound signals that include additional information; and
the additional information is received by the first wearable computing device, the additional information including data associated with at least one object in the physical space.

10. A wearable computing device comprising:
at least one processing device;
a memory storing instructions that when executed cause the at least one processing device to perform operations including:
transmitting, from a first wearable computing device, a first ultrasound signal;
receiving, by the first wearable computing device and responsive to the first ultrasound signal, a second ultrasound signal from a second wearable computing device, the second ultrasound signal including an identifier associated with the second wearable computing device;
identifying, by the first wearable computing device, a location of the second wearable computing device with respect to a location of the first wearable computing device, the location of the second wearable computing device being identified based on a determined time-of-flight of the first ultrasound signal;
establishing a wireless connection between the first wearable computing device and the second wearable computing device, the wireless connection based at least in part on the identifier and the identified location associated with the second wearable computing device;
causing, by the first wearable computing device and using the wireless connection, a retrieval of information from the second wearable computing device; and
causing presentation of the information on a display associated with the first wearable computing device.

11. The wearable computing device of claim 10, further comprising:
generating, based on the determined time-of-flight, a mapping of a physical space, the mapping defining:
a location for a plurality of objects associated with the physical space,
the location of the first wearable computing device,
the location of the second wearable computing device, and at least one location for any detected additional computing devices if additional ultrasound signals are received from respective detected additional computing devices; and providing the mapping to the second wearable computing device; and providing the mapping to the additional computing devices if the additional ultrasound signals are received.

12. The wearable computing device of claim 10, wherein:
the first ultrasound signal is at least one inaudible chirp signal generated according to an ultrasound communication protocol; and
the second ultrasound signal is at least one inaudible chirp signal generated according to the ultrasound communication protocol, the ultrasound communication protocol defining a relationship between frequency and time.

13. The wearable computing device of claim 10, wherein:
identifying, by the first wearable computing device, the location of the second wearable computing device with respect to the first wearable computing device is further based on a detected eye gaze direction associated with the first wearable computing device; and
establishing a wireless connection between the first wearable computing device and the second wearable computing device is further based on the detected eye gaze and triggers presentation of a control in the display associated with the first wearable computing device to begin an audio or video call with the second wearable computing device.

14. The computer-implemented method of claim 1, wherein establishing a wireless connection between the first wearable computing device and the second wearable computing device is further based on a detected eye gaze direction associated with the first wearable computing device.

15. A non-transitory, computer-readable medium having instructions stored thereon, the instructions, when executed by processing circuitry, cause a wearable computing device to:
transmit, from a first wearable computing device, a first ultrasound signal;
receiving, by the first wearable computing device and responsive to the first ultrasound signal, a second ultrasound signal from a second wearable computing device, the second ultrasound signal including an identifier associated with the second wearable computing device;
identify, by the first wearable computing device, a location of the second wearable computing device with respect to a location of the first wearable computing device, the location of the second wearable computing device being identified based on a determined time-of-flight of the first ultrasound signal;
establish a wireless connection between the first wearable computing device and the second wearable computing device, the wireless connection based at least in part on the identifier and the identified location associated with the second wearable computing device;
cause, by the first wearable computing device and using the wireless connection, a retrieval of information from the second wearable computing device; and cause presentation of the information on a display associated with the first wearable computing device.

16. The computer-readable medium of claim 15, further comprising:
generating, based on the determined time-of-flight, a mapping of a physical space, the mapping defining:
a location for a plurality of objects associated with the physical space,
the location of the first wearable computing device,
the location of the second wearable computing device, and
at least one location for any detected additional computing devices if additional ultrasound signals are received from respective detected additional computing devices; and
providing the mapping to the second wearable computing device; and
providing the mapping to the additional computing devices if the additional ultrasound signals are received.

17. The computer-readable medium of claim 16, further comprising:
in response to detecting an additional ultrasound signal from a third wearable computing device, updating the mapping to map the third wearable computing device and providing the updated mapping to each of the first, the second, and the third wearable computing devices, the updated mapping including, for each of the first, the second, and the third wearable computing devices, a location, a device identifier, and a plurality of options to communicate over the wireless connection.

18. The computer-readable medium of claim 15, wherein:
the first ultrasound signal is at least one inaudible chirp signal generated according to an ultrasound communication protocol; and
the second ultrasound signal is at least one inaudible chirp signal generated according to the ultrasound communication protocol, the ultrasound communication protocol defining a relationship between frequency and time.

19. The computer-readable medium of claim 15, wherein:
identifying, by the first wearable computing device, the location of the second wearable computing device with respect to the first wearable computing device is further based on a detected eye gaze direction associated with the first wearable computing device; and
establishing a wireless connection between the first wearable computing device and the second wearable computing device is further based on the detected eye gaze and triggers presentation of a control in the display associated with the first wearable computing device to begin an audio or video call with the second wearable computing device.

20. The computer-readable medium of claim 15, wherein:
the transmitting of the first ultrasound signal is triggered based on detecting, by the first wearable computing device, entry into a physical space configured to emit ultrasound signals that include additional information; and
the additional information is received by the first wearable computing device, the additional information including data associated with at least one object in the physical space.

* * * * *